US009894117B2

United States Patent
Huang et al.

(10) Patent No.: US 9,894,117 B2
(45) Date of Patent: Feb. 13, 2018

(54) FILE TRANSFERS FOR VIRTUAL CONFERENCES

(71) Applicant: CISCO TECHNOLOGY, INC., San Jose, CA (US)

(72) Inventors: Haihua Huang, Suzhou (CN); Jianping Shen, Suzhou (CN); Yong Qian, Suzhou (CN); Kejun Xia, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 14/049,767

(22) Filed: Oct. 9, 2013

(65) Prior Publication Data

US 2015/0100635 A1   Apr. 9, 2015

(51) Int. Cl.
G06F 15/16 (2006.01)
H04L 29/06 (2006.01)
H04L 29/08 (2006.01)

(52) U.S. Cl.
CPC ........ H04L 65/403 (2013.01); H04L 65/1089 (2013.01); H04L 67/06 (2013.01)

(58) Field of Classification Search
CPC ... H04L 65/403; H04L 65/1089; H04L 67/06; H04L 67/1053; H04L 67/1076; H04L 67/108; H04L 67/10; G06F 17/30209
See application file for complete search history.

(56) References Cited

U.S. PATENT DOCUMENTS

| 6,343,313 | B1 * | 1/2002 | Salesky | G06F 3/1415 |
| | | | | 709/203 |
| 8,051,205 | B2 * | 11/2011 | Roy | G06F 15/16 |
| | | | | 709/238 |
| 2005/0157660 | A1 * | 7/2005 | Mandato | H04L 29/06 |
| | | | | 370/254 |
| 2009/0234967 | A1 * | 9/2009 | Yu | H04L 67/06 |
| | | | | 709/232 |
| 2011/0161409 | A1 * | 6/2011 | Nair | G06F 8/38 |
| | | | | 709/203 |
| 2013/0091230 | A1 * | 4/2013 | Dentamaro | H04L 67/06 |
| | | | | 709/206 |

(Continued)

FOREIGN PATENT DOCUMENTS

WO   WO2011121269   * 10/2011
WO   WO2011121269 A1 * 10/2011

OTHER PUBLICATIONS

Wikipedia, the free encyclopedia, "BitTorrent," last modified Oct. 7, 2013, retrieved and printed on Oct. 9, 2013, 20 pages; http://en.wikipedia.org/wiki/Bittorrent.

*Primary Examiner* — Sargon Nano
*Assistant Examiner* — Kidest Mendaye

(57) ABSTRACT

In an example embodiment, a virtual conference is established with a server and a plurality of endpoint devices. One endpoint device, acting as a sender, may transfer a file to N other endpoint devices, acting as receivers. The sender divides the file in at least N segments and delivers one segment to each receiver. Receivers then request the next desired segment from one or more devices containing that segment. If m devices hold the segment, the segment may be divided into m parts, and one part may be requested from each device.

14 Claims, 7 Drawing Sheets

(56) References Cited

U.S. PATENT DOCUMENTS

2014/0095605 A1* 4/2014 Varvello ............... H04L 67/108
                                                    709/204
2014/0149512 A1* 5/2014 Leitch ................. H04L 67/1061
                                                    709/204

* cited by examiner

FILE TRANSFERS FOR VIRTUAL CONFERENCES

FIELD OF THE DISCLOSURE

This disclosure relates in general to the field of communications and, more particularly, to file transfers in a multimedia conference session over a network environment.

BACKGROUND

In certain architectures, service providers and/or enterprises may seek to offer sophisticated online conferencing services for their end users. The conferencing architecture can offer an "in-person" conference experience over a network. Conferencing architectures can also deliver real-time interactions between people using advanced visual, audio, and multimedia technologies. Virtual conferences and conferences have an appeal because they can be held without the associated travel inconveniences and costs. In addition, virtual conferences can provide a sense of community to participants who are dispersed geographically.

BRIEF DESCRIPTION OF THE DRAWINGS

The present disclosure is best understood from the following detailed description when read with the accompanying figures.

DETAILED DESCRIPTION OF THE EMBODIMENTS

Overview

Figure 1:
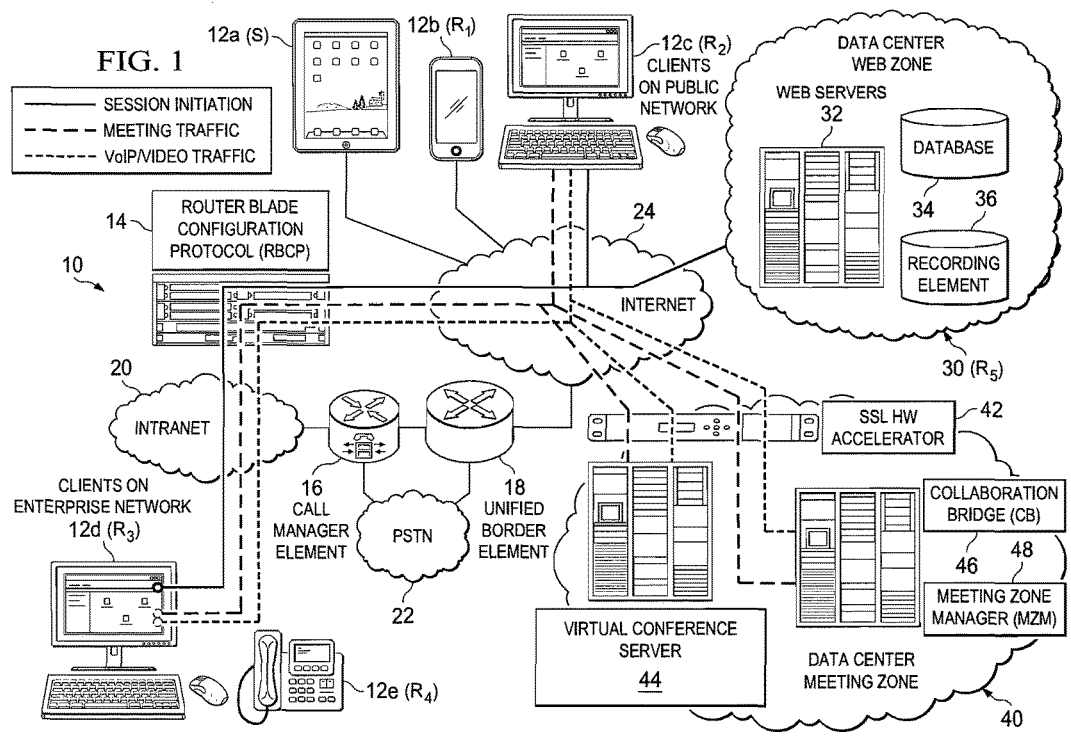
FIG. 1 is a network diagram of a virtual conference system according to an example embodiment the present specification.

In one example, there is disclosed a method to enable transfer of a file from a sender device to $N$ receiver devices, the method including activities that can: initiate a connection to a virtual conference via a virtual conference server and act as the sender by: (a) dividing the file into at least $N$ segments; building a table comprising data correlating the segments to the devices; sending the table to the virtual conference server send a first segment to each receiver in a first iteration; and sending a part of another segment to a requesting receiver on a second iteration. The method can also include acting as one of the receivers by receiving a first segment of the file from the sender; storing the first segment on a memory; querying the virtual conference server for the table; determining from the table a second device having stored on its memory a next desired segment of the file; and requesting from the second device at least part of the next desired segment of the file.

Example Embodiments of the Disclosure

The following disclosure provides many different embodiments, or examples, for implementing different features of the present specification. Specific examples of components and arrangements are described below to simplify the present specification. These are, of course, merely examples and are not intended to be limiting. Further, the present specification may repeat reference numerals and/or letters in the various examples. This repetition is for the purpose of simplicity and clarity and does not in itself dictate a relationship between the various embodiments and/or configurations discussed.

FIG. 1 is a simplified schematic diagram of a virtual conference system 10 for managing file transfers in accordance with at least one example embodiment. Virtual conference system 10 may include a number of endpoints 12a-e that may achieve suitable network connectivity via various points of attachment. In the examples throughout this specification, endpoint 12a will be used as sender S, and endpoints 12b-e will be used as receivers R1-R4. In the example of FIG. 1, virtual conference system 10 includes an Intranet 20, a public switched telephone network (PSTN) 22, and an Internet 24, which (in this particular example) offers a pathway to a data center web zone 30 and a data center conference zone 40.

Data center web zone 30 includes a plurality of web servers 32, a database 34, and a recording element 36. Because data center web zone 30 may be recording proceedings of the virtual conference, it will be used in the examples throughout this specification as R5. Data center conference zone 40 includes a secure sockets layer hardware (SSL HW) accelerator 42, a plurality of virtual conference servers (VCS) 44, a collaboration bridge 46, and a conference zone manager 48. In at least one example embodiment, each VCS may be configured to coordinate video and voice traffic for a given virtual conference.

Various types of routers and switches may be used to facilitate communications among any of the elements of FIG. 1. For example, a call manager element 16 and a unified border element 18 may be provisioned between PSTN 22 and Intranet 20. Also depicted in FIG. 1 are a number of pathways (e.g., shown as solid or broken lines) between the elements for propagating conference traffic, session initiation, and voice over Internet protocol (VoIP)/video traffic.

It is sometimes desirable for participants in a virtual conference to share files with one another in near real time. For example, in the course of a virtual conference, a user may wish to share a document, video file, audio file, or similar file with other participants. While the file could be displayed on a shared desktop, the quality may be relatively low compared to the native file, and participants may not be able to operate on the file itself. Thus, a user operating an endpoint device S (sender) of a virtual conference, such as a desktop computer, laptop computer, mobile device, smartphone, or similar, may decide to send a file to a plurality of endpoints R1-R5 (receivers 1-5) for purposes of discussion.

While one option is to send the file to the server and let the server then distribute the file to each receiver, this may not optimally utilize storage and network bandwidth resources. Another option is to use a peer-to-peer (P2P) mode, such as that provided by the extensible messaging and presence protocol (XMPP). However, it may not be optimally efficient for sender S to create a P2P connection with each receiver and transfer the full file to each receiver, as this may swamp sender S's network connection while other connections may be underutilized.

In an example of the present specification, sender S instead divides the file into 5 substantially equal segments and then initiates a P2P connection to each receiver. Sender S sends one segment to each receiver, and then may simply wait for requests from receivers for additional segments. For its part, an example receiver R1 receives segment 1 from sender S and stores it in memory, and then on subsequent iterations identifies another device (sender S or another receiver) that has the next segment, for example segment 2. Receiver R1 may request segment 2 from one of these devices. On subsequent iterations, receiver R1 may request segments 3, 4, and 5. Each iteration will provide more endpoint devices to choose from, as more endpoint devices will have received that segment. Alternatively, receiver R1 could divide segment 2 into two substantially-equal parts, and request the first part from one device and the second part from another device. As the number of devices having the required segment increases on subsequent iterations, the required segment may be divided into more parts. In the preceding paragraph and throughout this specification, a "segment" can include any portion of a file, up to and including the complete file. A "part" as used herein in this specification can include any portion of a segment, up to and including the complete segment.

In one embodiment, virtual conference system 10 can provide a method to increase efficient bandwidth utilization in online conference scenarios (e.g., WebEx™, Telepresence™, GoToConference™, Google Hangouts™, Skype™, etc.). In one example implementation, based on the attendee status, a server can simply send personalized data to the user that is reflective of what the user wants. More specifically, the architecture can divide conference resources into several categories (video data, desktop share data, and audio data). In operation, the system can systematically monitor the attendee's status to identify which parts of the conference resources are not of interest to the attendee. This information can be reported to a server, which can disable that specific supply of information.

Note that in real-world applications, attendees are not required to concentrate on every aspect of an online conference. As users disengage from a given conference, an attendee may not fully quit a conference, and such behavior becomes wasteful. Optimizing this bandwidth usage can reduce the pressure on the server, provide a better allocation of network resources, and conserve relatively-scarce mobile resources.

Consider a first voice-only mode in which a server simply sends voice data to a client. During the conference, in this particular example, the attendee is only interested in speech and, therefore, is indifferent to the video data, or to the documents being shared by a given presenter. The architecture of the present specification can detect these preferences, for example in a desktop endpoint, by identifying the conference client window being at least partially covered by another window. In other cases, the client can also detect the shown regions of the display screen. This information can be used to more intelligently deliver/prune resources for the endpoint.

When an endpoint is in an inactive mode, a server could simply keep a session alive and not provide any substantive data to client. This could include no content being provided to the client, while the session is still maintained. In a recovery mode, based on the current attendee's status, the system can be switched back and forth to the appropriate corresponding mode (e.g., automatically).

Figure 2:
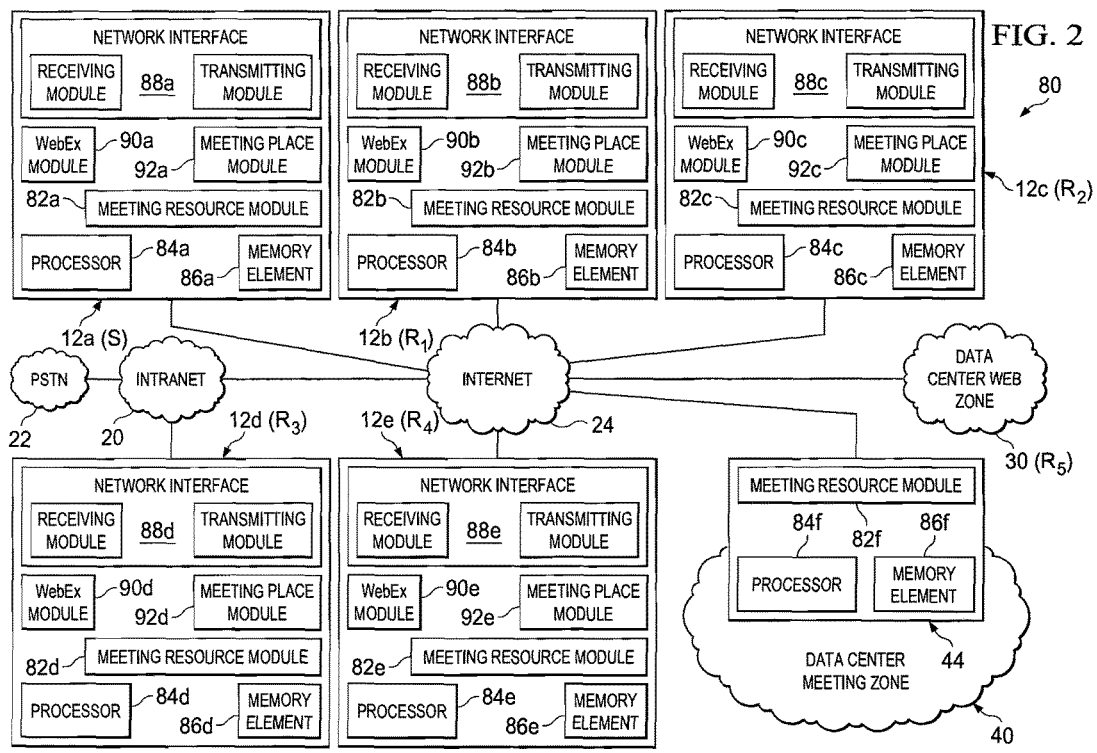
FIG. 2 is a series of block diagrams of a several endpoints according to an example embodiment of the present specification.

FIG. 2 is a simplified schematic diagram illustrating possible details related to an example infrastructure of virtual conference system 10 in accordance with at least one example embodiment. Each of endpoints 12a-e are provisioned with a respective conference resource module 82a-e, a respective processor 84a-e, a respective memory element 86a-e, a respective WebEx module 90a-e, a respective meeting place module 92a-e, and a respective network interface 88a-e, which includes a respective receiving module and a respective transmitting module for exchanging data (e.g., for exchanging packets in a network environment). In an example, meeting place module 92, conference resource module 82, and WebEx module 90 are collectively referred to as virtual conference client (VCC) 732, which may be provided as one or more discrete hardware and/or software modules. A more detailed block diagram of an example endpoint device is provided in FIG. 7 below.

In at least one example embodiment, each endpoint 12a-e and/or VCS 44 includes software (e.g., as part of conference resource modules 82a-f) to achieve or to support managing file transfers, as outlined herein. In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing file transfers.

It is imperative to note that FIG. 2 is indicative of just one of the multitude of example implementations of virtual conference system 10. Any of the modules or elements within endpoints 12a-e and/or VCS 44 may readily be replaced, substituted, or eliminated based on particular needs. Furthermore, although described with reference to particular scenarios, where a given module (e.g., WebEx module 90a-e, meeting place module 92a-e, conference resource module 82a-e, etc.) is provided within endpoints 12a-e or VCS 44, any one or more of these elements may be provided externally, or consolidated and/or combined in any suitable fashion. In certain instances, certain elements may be provided in a single proprietary module, device, unit, etc. in order to achieve the teachings of the present specification.

Endpoints 12a-e are representative of any type of client or user wishing to participate in a conference session in virtual conference system 10 (e.g., or in any other online platform). Furthermore, endpoints 12a-e may be associated with individuals, clients, customers, or end users wishing to participate in a conference session in virtual conference system 10 via some network. The term "endpoint device" as used herein is inclusive of devices used to initiate a communication, such as a computer, mobile device, or any other device, component, element, or object capable of initiating voice, audio, video, media, or data exchanges within virtual conference system 10. Endpoints 12a-e may also be inclusive of a suitable user interface 740, including for example a microphone, a camera, a display, or a keyboard or other terminal equipment. Endpoints 12a-e may also be any device that seeks to initiate a communication on behalf of another entity or element, such as a program, a proprietary conferencing device, a database, or any other component, device, element, or object capable of initiating an exchange within virtual conference system 10. "Data" as used herein in this specification can include any type of numeric, voice, video, media, or script data, or any type of source or object code, or any other suitable information in any appropriate format that may be communicated from one point to another.

VCS 44 and web servers 32 are network elements that manage (or that cooperate with each other in order to manage) aspects of a conference session. "Network element" as used herein in this specification can include any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, VCS 44 and web servers 32 are servers that may interact with each other via the networks of FIG. 1.

Intranet 20, PSTN 22, and Internet 24 represent a series of points or nodes of interconnected communication paths for receiving and transmitting packets of information that propagate through virtual conference system 10. These networks may offer connectivity to any of the devices or endpoints of FIG. 1. Moreover, Intranet 20, PSTN 22, and Internet 24 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 20, PSTN 22, and Internet 24 may support a transmission control protocol (TCP)/IP, or a user datagram protocol (UDP)/IP in particular embodiments of the present specification; however, Intranet 20, PSTN 22, and Internet 24 may alternatively implement any other suitable communication protocol for transmitting and receiving data packets within virtual conference system 10. Note also that Intranet 20, PSTN 22, and Internet 24 may accommodate any number of ancillary activities, which may accompany a conference session. This network connectivity may facilitate all informational exchanges (e.g., notes, virtual whiteboards, PowerPoint presentations, e-mailing, word-processing applications, etc.). Along similar reasoning, Intranet 20, PSTN 22, and Internet 24 may foster all such communications and, further, be replaced by any suitable network components for facilitating the propagation of data between participants in a conferencing session.

It should also be noted that endpoints 12*a-e* and VCS 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with managing file transfers. In a general sense, the arrangement depicted in FIG. 2 may be more logical in its representations, whereas a physical architecture may include various permutations/combinations/hybrids of these elements.

Note that in certain example embodiments, the file transfers functions outlined herein may be implemented by logic encoded in one or more non-transitory tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element may store data used for the operations described herein. This includes the memory element being able to store software, logic, code, or processor instructions that may be executed to carry out the activities described in this specification. A processor may execute any type of instructions associated with the data to achieve the operations detailed in this specification. In one example, a processor may transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, conference resource modules 82*a-e* include software in order to achieve the file transfers functions outlined herein. These activities may be facilitated by VCS 44 and/or the various endpoints 12*a-e*. VCS 44 and/or endpoints 12*a-e* may include memory elements for storing information to be used in managing file transfers, as outlined herein. Additionally, VCS 44 and/or endpoints 12*a-e* may include a processor that may execute software or an algorithm to perform file transfers, as discussed in this specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this specification should be construed as being encompassed within the broad term 'processor.'

Figure 3:
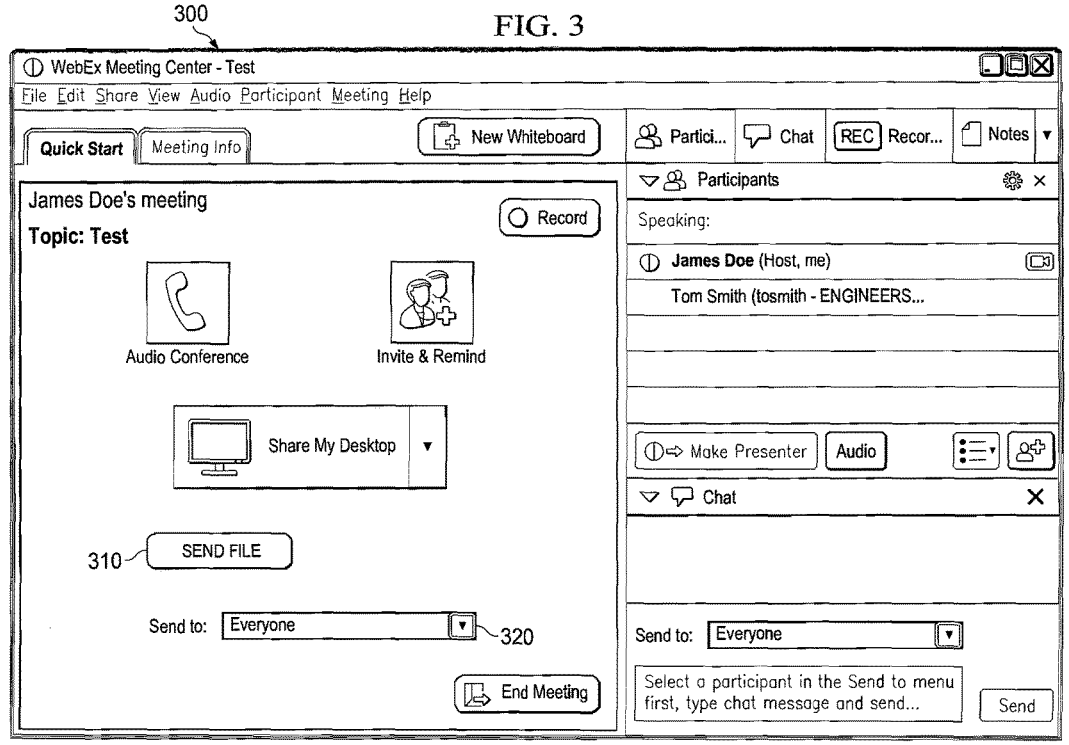
FIG. 3 is an example drawing of a user interface element of a virtual conference client (VCC) according to an example embodiment of the present specification.

FIG. 3 is a screenshot illustrating an example user interface element 300 associated with VCC 732 in at least one example of an endpoint 12. In this particular example, a "Send File" button 310 is provided, and a drop-down box 320 is provided to select recipients of the file. It should be noted, however, that this configuration is only one of many possible configurations for a graphical user interface, and any graphical user interface providing similar functionality is intended to be covered within the broad scope of this specification.

Figure 4:
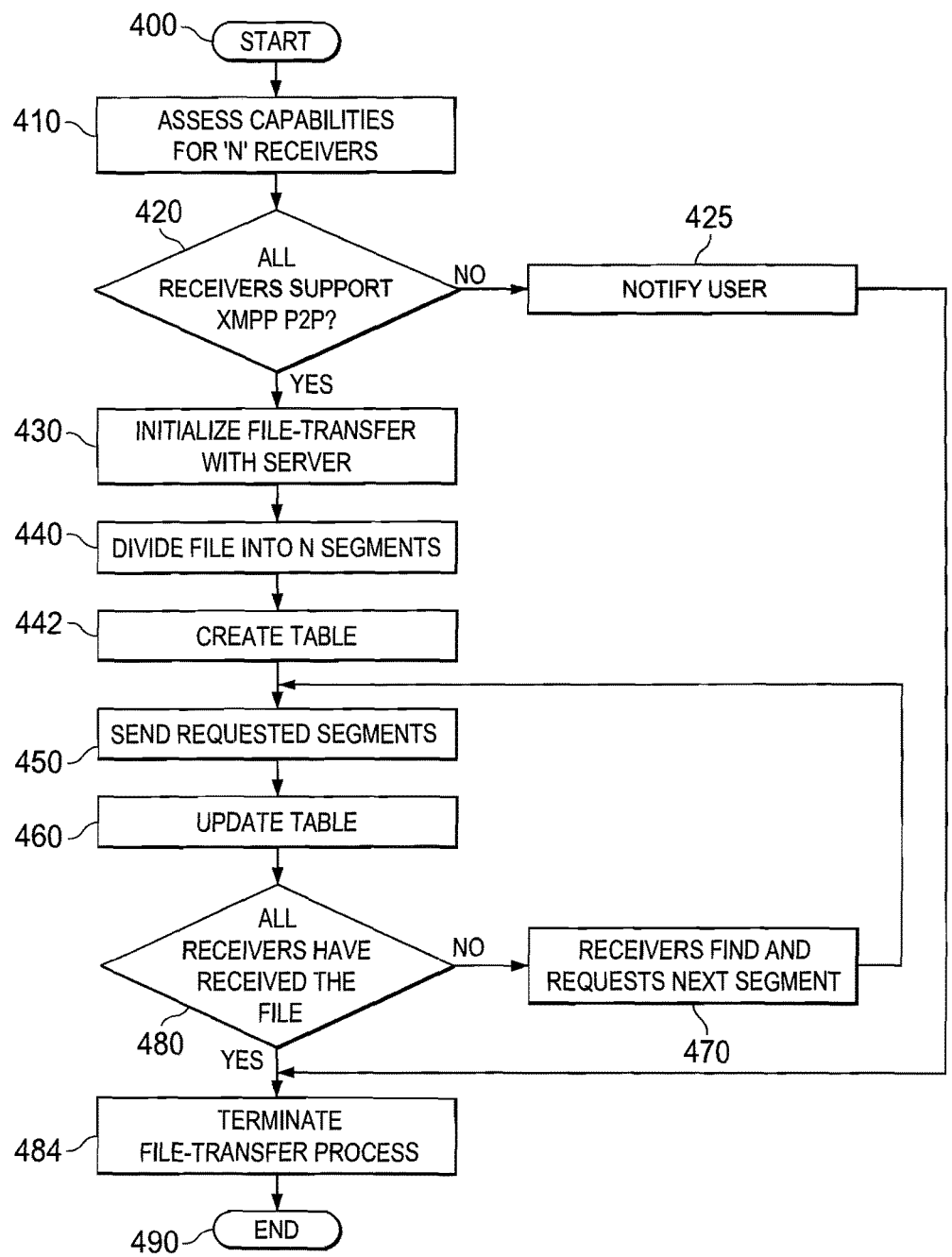
FIG. 4 is a flowchart of a method according to an example embodiment of the present specification.

FIG. 4 is a flowchart of a file transfer method according to an example embodiment of the present specification, starting at block 400. In block 410, sender S queries VCS 44 for the capabilities of each of five receivers, which in this example include endpoints 12*b* (R1), 12*c* (R2), 12*d*(R3), 12*e* (R4), and data center web zone 30 (R5). The purpose is to determine which clients support a P2P connection, such as over the XMPP protocol, including whether any devices are behind for example a firewall that blocks necessary ports. In block 420, if there are unsupported devices, then in block 425 the user trying to send the file is notified, and in block 484, the file transfer is terminated. Note that completely terminating the file transfer is not the only option in this scenario. In other examples, the user could be asked to remove certain receivers from the list, or unsupported receivers could be relegated to a separate transfer track wherein the server completes the file transfer to unsupported devices only. In other embodiments, the user could simply be notified that certain endpoint devices do not support P2P file transfer and so will not receive the file.

An example request-respond exchange may include the following pseudocode. Request (from sender S):

```
<iq from='sender_S@example.com/resource'
    id='get1'
    to='receiver_R@example.org/resource'
    type='get'>
  <query xmlns='http://jabber.org/protocol/bytestreams/muc-file-transfer/
    local-ip'/>
</iq>
          Response (from entity N):
<iq to='sender_S@example.com/resource'
    id='get1'
    from='receiver_R@example.org/resource'
    type='result'>
  <query xmlns='http://jabber.org/protocol/bytestreams/muc-file-transfer/
    local-ip'>
    <streamhost
      jid='receiver_R@example.com/resource'
      host='192.168.1.1'
      port='1234'/>
  </query>
</iq>
```

In block 430, if all receivers support P2P file transfer, for example over XMPP, or if a subset of supported receivers have been identified, then sender S may send a signal to VCS 44 to initialize a P2P file transfer session, indicating for example that sender S is prepared to send the file to $N$ receivers, where in this case $N=5$. "Signal" as used herein in this specification can include any command, message, data packet, data file, or other information medium for communication between devices.

In block 440, sender S divides the file into N discrete segments, which may be of substantially equal size. For example, if the file is 1 Mb (1,048,576 bytes), then four segments may be 209,715 bytes, and one may be 209,716 bytes. It is imperative to note, however, that substantially equal-sized segments is only one of many possible division schemes. For example, in other embodiments, the segment sizes may be dynamically allocated by assessing the bandwidth or other capabilities of the receivers, and sending proportionally larger file segments to more capable receivers.

In block 442, sender S creates and initializes a table correlating data segments of a file to sender devices and receiver devices. A "table" as used herein in this specification can include any chart, spreadsheet, database, database record, or similar data structure having stored therein organized data. In this particular example, the table is particularly configured to contain useful information about the file itself and the data held by the senders and receivers, as well as other useful information such as data concerning the capabilities of each endpoint device. An example table may include the following data:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S |
| 2 | 209,715 | 209,715 | 419,429 | S |

-continued

| Name: Testfile.bin | | Size: 1,048,576 bytes | | |
|---|---|---|---|---|
| Segment | Size (bytes) | Start | End | Contained In |
| 3 | 209,715 | 419,430 | 629,144 | S |
| 4 | 209,715 | 629,145 | 838,859 | S |
| 5 | 209,716 | 838,860 | 1,048,575 | S |

As seen above, the table contains the name of the file, the size of the file, and then entries for each of the five segments to accommodate a file transfer where N=5. For each segment, the table identifies the size of the segment, the segment's starting offset, and the segment's ending offset. There is also an entry identifying which devices are holding each segment in memory. Devices in this context include both sender S and receivers R1-R5. In the initialized table, sender S is the only device containing any of the five segments, as no data has yet been sent.

Pseudocode for an example method of creating a table and setting an initial value for the sender may include the following:

```
<iq type='set' to='chatid@conference.com' from='sender@example.com/
resource'
xml:lang='en' id='create1'>
  <command xmlns='http://cisco.com/muc-file-transfer' action='create'>
    <x xmlns='jabber:x:data' type='submit'>
      <field var='entityid' type='jid'>
        <value>sender@example.com</value>
      </field>
      <field var='segment' type='list-multi'>
        <value>1</value>
        <value>2</value>
        <value>3</value>
        <value>4</value>
        <value>5</value>
      </field>
    </x>
  </command>
</iq>
```

In block 450, sender S initializes a P2P connection with each of the receivers R1-R5, and may send to each a different segment of the file. It is imperative to note however that sending different segments is not an absolute requirement, and other configurations are possible. For example, in some embodiments it may be more efficient to send one segment to two different receivers on the first iteration. Many other configurations are also possible. Further, rather than sender S initiating the connection and sending the segments, receivers R1-R5, having been notified of the transfer, may initiate connections and request a segment from sender S. After receiving a segment, each receiver R1-R5 stores that segment in its memory, and then sends a signal to VCS 44 that is used to update the table in block 460.

After the first iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1 |
| 2 | 209,715 | 209,715 | 419,429 | S, R2 |
| 3 | 209,715 | 419,430 | 629,144 | S, R3 |
| 4 | 209,715 | 629,145 | 838,859 | S, R4 |
| 5 | 209,716 | 838,860 | 1,048,575 | S, R5 |

Pseudocode for an example method of updating the table may include the following:

```
<iq type='set' to='chatid@conference.com' from='entity1@example.com/resource'
xml:lang='en' id='update1'>
    <command xmlns='http://cisco.com/muc-file-transfer' action='update'>
        <x xmlns='jabber:x:data' type='submit'>
            <items xmlns='http://cisco.com/muc-file-transfer/segments'>
                <item>
                    <field var='entityid' type='jid'>
                        <value>entity1@example.com</value>
                    </field>
                    <field var='segment' type='list-multi'>
                        <value>1</value>
                    </field>
                </item>
            </items>
        </x>
    </command>
</iq>
```

In block 480, receivers R1-R5 do not yet have all segments of the file. Therefore, in block 470, each receiver may use the table to identify a next segment that is needed.

Pseudocode for an example method of identifying a device with the next desired segment, in this case segment 2, may include the following:

```
<iq type='get' to='chatid@conference.com' from='entity1@example.com/resource'
xml:lang='en' id='search1'>
```

-continued

```
    <command xmlns='http://cisco.com/muc-file-transfer' action='search'>
        <x xmlns='jabber:x:data' type='submit'>
            <field var='segment' type='list-multi'>
                <value>2</value>
            </field>
        </x>
    </command>
</iq>
```

Pseudocode for an example method of responding to the foregoing request may include the following:

```
<iq type='result' from='chatid@conference.com' to='entity1@example.com/resource'
xml:lang='en' id='search1'>
```

-continued

```
    <command xmlns='http://cisco.com/muc-file-transfer' action='update'>
        <x xmlns='jabber:x:data' type='result'>
            <items xmlns='http://cisco.com/muc-file-transfer/segments'>
                <item>
                    <field var='entityid' type='jid'>
                        <value>entity2@example.com</value>
                    </field>
                    <field var='segment' type='list-multi'>
                        <value>2</value>
                    </field>
                </item>
            </items>
        </x>
    </command>
</iq>
```

Segments may be requested sequentially in one example, although many other configurations are possible. In this example, receiver R1 has segment 1, and may identify segment 2 as the next required segment. Segment 2 is held by both sender S and receiver R2. In this example, receiver R1 may request segment 2 from only one of the foregoing devices. The method of selecting which device to select the segment from may be based on additional capability information stored in the table (such as selecting the device with the most available bandwidth), may be pseudorandom, or some other method may be used. To retrieve the next segment, receiver R1 may form a P2P connection for example with receiver R2, and request segment 2 of the file.

Pseudocode of an example method of receiver R1 requesting segment 2 from receiver R2 may include the following:

```
<iq type='set' id='offer1' to='r2@example.com/resource' from='r1@example.com/resource'>
    <si xmlns='http://jabber.org/protocol/si'
        id='a0'
        mime-type='text/plain'
        profile='http://jabber.org/protocol/si/profile/file-transfer'>
        <file xmlns='http://cisco.com/muc-file-transfer'
            name='test.txt'
            segno='12'
            size='209715'>
        </file>
        <feature xmlns='http://jabber.org/protocol/feature-neg'>
            <x xmlns='jabber:x:data' type='form'>
                <field var='stream-method' type=list-single'>
                    <option><value>http://jabber.org/protocol/bytestreams</value></option>
                </field>
            </x>
        </feature>
    </si>
</iq>
```

Other receivers may similarly request other segments of the file from other devices. After this second iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1, R5 |
| 2 | 209,715 | 209,715 | 419,429 | S, R1, R2 |
| 3 | 209,715 | 419,430 | 629,144 | S, R2, R3 |
| 4 | 209,715 | 629,145 | 838,859 | S, R3, R4 |
| 5 | 209,716 | 838,860 | 1,048,575 | S, R4, R5 |

After a third iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1, R4, R5 |
| 2 | 209,715 | 209,715 | 419,429 | S, R1, R2, R5 |
| 3 | 209,715 | 419,430 | 629,144 | S, R1, R2, R3 |
| 4 | 209,715 | 629,145 | 838,859 | S, R2, R3, R4 |
| 5 | 209,716 | 838,860 | 1,048,575 | S, R3, R4, R5 |

After a fourth iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1, R3, R4, R5 |
| 2 | 209,715 | 209,715 | 419,429 | S, R1, R2, R4, R5 |
| 3 | 209,715 | 419,430 | 629,144 | S, R1, R2, R3, R5 |
| 4 | 209,715 | 629,145 | 838,859 | S, R1, R2, R3, R4 |
| 5 | 209,716 | 838,860 | 1,048,575 | S, R2, R3, R4, R5 |

After a fifth iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1, R2, R3, R4, R5 |
| 2 | 209,715 | 209,715 | 419,429 | S, R1, R2, R3, R4, R5 |
| 3 | 209,715 | 419,430 | 629,144 | S, R1, R2, R3, R4, R5 |
| 4 | 209,715 | 629,145 | 838,859 | S, R1, R2, R3, R4, R5 |
| 5 | 209,716 | 838,860 | 1,048,575 | S, R1, R2, R3, R4, R5 |

At this point, block 480 is true. All receivers have received the complete file. In block 484, VCS 44 may send a signal to sender S and receivers R1-R5 indicating that the file transfer has been completed. Alternately, if there is an error during the transfer process, an error message may be sent and the process interrupted. In block 490, the process is complete.

Note that although the foregoing is disclosed as a series of discrete, synchronous iterations for convenience of discussion, other configurations are possible. For example, a receiver with a slower connection may complete an "iteration" more slowly than a receiver with a faster connection. In that case, the faster receiver may update the table and move on without waiting for the slower receiver.

Figure 5:
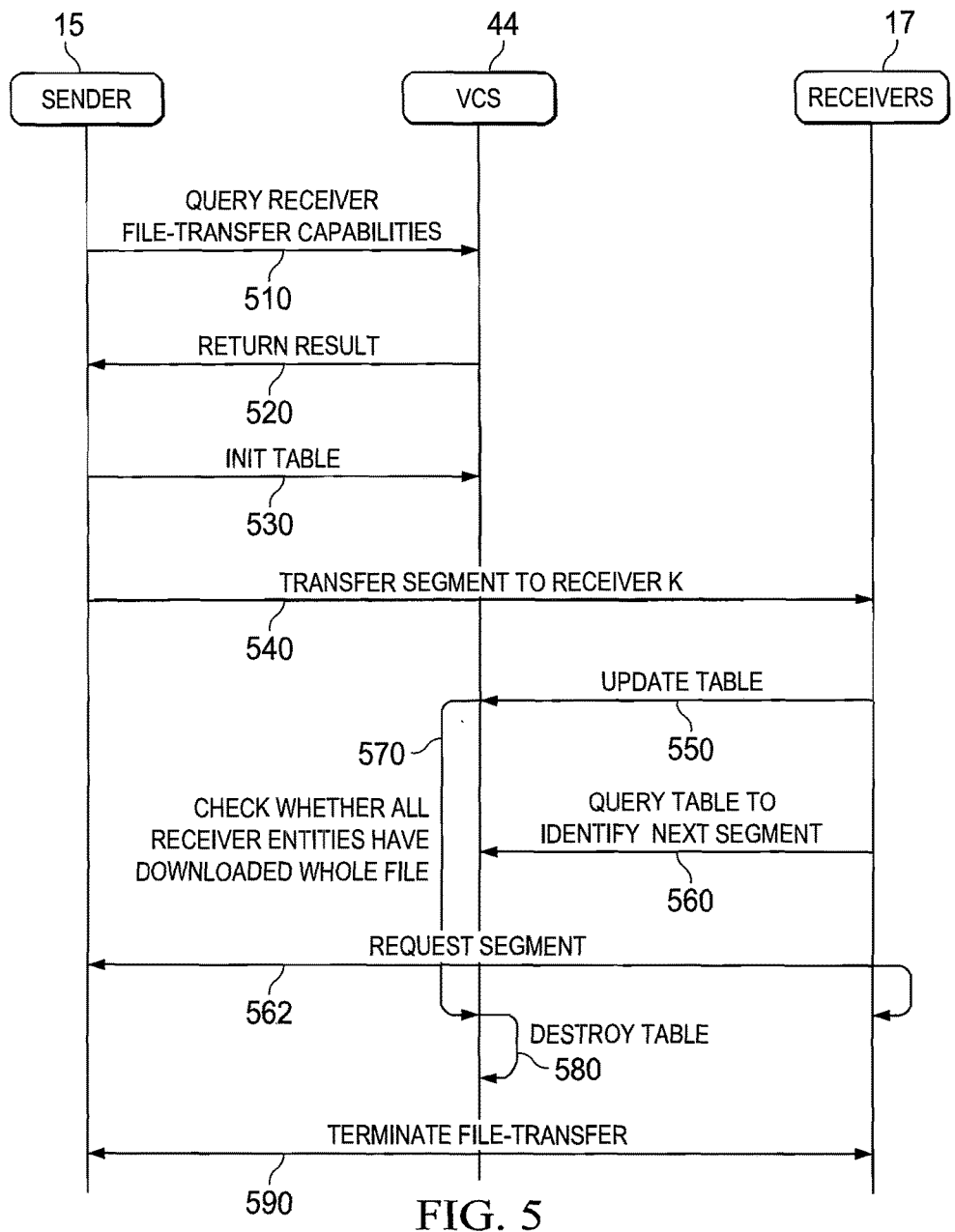
FIG. 5 is a signal flow diagram according to an example embodiment of the present specification.

FIG. 5 is a signal flow diagram disclosing the exchange of signals in an example method, such as that disclosed in FIG. 4, where the signaling can involve any number of senders 15, VCS 44, and any number of receivers 17. It is imperative to note that these signal paths are disclosed by way of example only, and that in other embodiments, other signal paths may be used. In this example, sender S sends a signal 510 to query file transfer capabilities of the receivers (such as P2P capabilities) to VCS 44. VCS 44 returns a signal 520 with the results of the query. Sender S may send signal 530 to VCS 44 containing the initialized table, or data from which an initialized table can be built. Sender S sends signal 540 to receivers R1-R5 to transfer a first file segment in the first iteration. Thereafter, receivers R1-R5 may send signals 550 to VCS 44 to update the table, and signal 560 to query the table and identify devices that contain the next required segment. Signal 570 is an internal signal to VCS 44, in which the table is checked to see whether all receivers have received all segments of the file. Signal 562 may originate from receivers R1-R5 and may be sent either to sender S or other receivers R1-R5, requesting next required segments of the file. Signal 580 is an internal signal to VCS 44 to destroy the table, which has completed its purpose. Signal 590 is sent from VCS 44 to sender S and receivers R1-R5 successfully terminating the file transfer operation.

Figure 6:
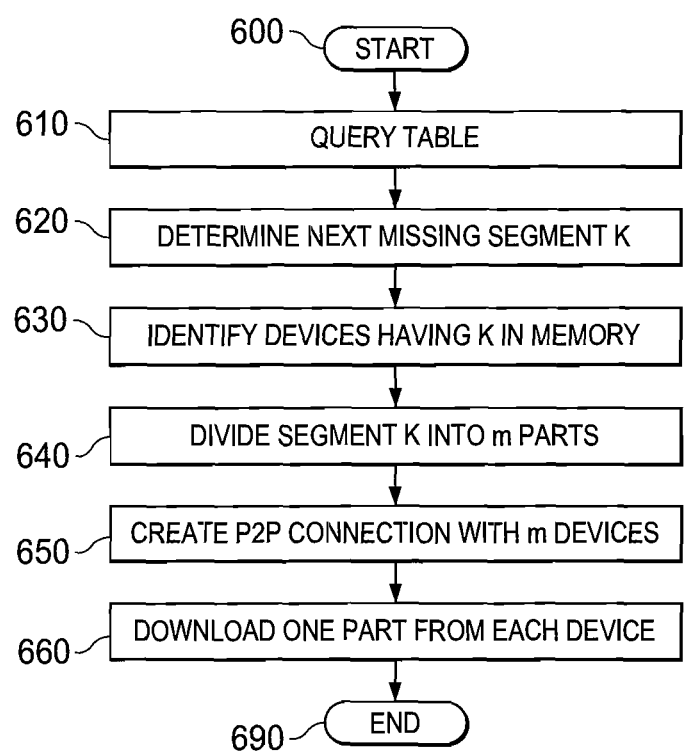
FIG. 6 is a flowchart according to an example embodiment of the present specification.

FIG. 6 discloses an alternative example embodiment to the method of FIG. 4. In this example, the method 600 disclosed is primarily from the point of view of receivers R1-R5, and includes steps that may be taken between, in conjunction with, or in addition to the steps 450-480 of FIG. 4. For simplicity of discussion, the following will disclose the method from the point of view of a single receiver R1, which may be for example receiver 12*b*. Staring in block 610, receiver R1 queries VCS 44 for the table. In this example, sender S has already sent a first segment to each receiver R1-R5, so the table appears as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1 |
| 2 | 209,715 | 209,715 | 419,429 | S, R2 |
| 3 | 209,715 | 419,430 | 629,144 | S, R3 |
| 4 | 209,715 | 629,145 | 838,859 | S, R4 |
| 5 | 209,716 | 838,860 | 1,048,575 | S, R5 |

In block 620, receiver R1 may determine that its next required segment is segment 2, which is currently held by sender S and receiver R2. In block 630, receiver R1 determines from the table that two devices, S and R2, have segment 2 in memory. More generically, in block 630 receiver R2 determines that $m$ devices hold desired segment $k$ in memory. In block 640, receiver R2 divides segment $k$ into $m$ parts, which may be substantially equal in size or which may be divided non-equitably as with the segments themselves. For example, receiver R1 may divide segment 2 into a 104,858-byte part and a 104,857-byte. In block 650, receiver R1 may form a P2P connection with both sender S and receiver R2. In block 660, receiver R1 downloads the respective parts of segment 2 from sender S and receiver R2, thus finishing the iteration in block 690.

Similarly, on the next iteration, the table may look as follows:

| Name: Testfile.bin | | Size: 1,048,576 bytes | | |
|---|---|---|---|---|
| Segment | Size (bytes) | Start | End | Contained In |
| 1 | 209,715 | 0 | 209,714 | S, R1, R5 |
| 2 | 209,715 | 209,715 | 419,429 | S, R1, R2 |
| 3 | 209,715 | 419,430 | 629,144 | S, R2, R3 |
| 4 | 209,715 | 629,145 | 838,859 | S, R3, R4 |
| 5 | 209,716 | 838,860 | 1,048,575 | S, R4, R5 |

In this iteration, receiver R1 may need to download segment 3. Receiver R1 may determine from the table that sender S, receiver R2, and receiver R3 have the segment. In this case, receiver R1 divides segment 3 into three equally-sized parts of 69,905 bytes and requests one part from each of the three target devices. Receiver R1 may similarly divide the file into four parts on the next iteration, and five parts on the iteration after.

Figure 7:
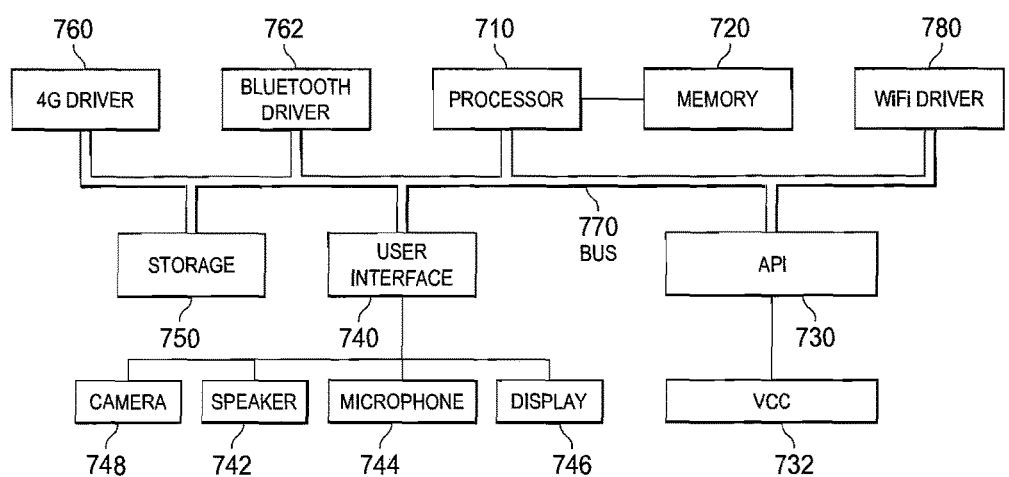
FIG. 7 is a block diagram disclosing with more particularity an endpoint according to an example embodiment of the present specification.

FIG. 7 is a block diagram that discloses an endpoint 12 with more particularity. As described above, endpoint 12 is controlled by a processor 710, which is communicatively coupled to a memory element 720. In an example, processor 710 is communicatively coupled to other system elements via bus 770. Those elements may include, by way of non-limiting example, a 4G driver 760, a Bluetooth driver 762, a WiFi driver 780, an application programming interface 730, a user interface 740, and storage 750, which in some cases may be a species of memory element 720. It is expressly intended that any of the above elements can be realized in hardware, software, firmware, or any combination thereof.

In this example, 4G driver 760 is disclosed as a species of low-bandwidth data network, and any other low-bandwidth data network may be substituted. A low-bandwidth data network as used herein in this specification can include any communication medium of a mobile device, whether analog, digital, or mixed-signal, that is relatively encumbered with respect to a high-bandwidth data network, including for example by limited bandwidth, limited data volume, limited availability, or increased cost. Non-limiting examples of low-bandwidth data networks include analog cellular networks, digital PCS networks, 2G data networks, 3G data networks, 4G WiMAX, and 4G LTE data networks. In contrast, WiFi driver 780 is disclosed as a species of high-bandwidth data network. A high-bandwidth data network as used herein in this specification can include any network that is relatively free of the encumbrance of a low-bandwidth data network, and may include for example an IEEE 802.11(n) WiFi network or an Ethernet, Firewire, USB, fiberoptic, or other wired network. In some example embodiments, the foregoing lists may include some crossover. For example, a mobile device may have access to a higher-bandwidth 4G or better network, but may default to a lower-bandwidth 3G or 2G network if a 4G signal cannot be found. In that case, the 4G network may be treated as a the high-bandwidth data network for purposes of this specification, while the default 3G or 2G network may be treated as the low-bandwidth data network. In yet other embodiments, the roles may be reversed. For example, a wireless carrier may provide for unlimited monthly data consumption on a 2G or 3G network, while 4G traffic may be capped. In that case, both networks have a species of encumbrance, and the division between the two networks may depend on a user preference. For example, to conserve 4G data consumption for other desired activities, the user may elect to treat the 2G or 3G network as the relatively-unencumbered "high-bandwidth data network" for purposes of this specification, and treat the 4G data network as the relatively-encumbered "low-bandwidth data network." Thus, the broad definitions of the two foregoing terms are not intended to be limited to any specific configuration.

Bluetooth driver 762 is disclosed as a species of short-range transceiver. A short-range transceiver as used herein in this specification can include any communication device or medium configured to operate as an intermediary between a user and user interface 740. In many examples, short-range transceiver will be configured to operate over short ranges compared to WiFi driver 780 and 4G driver 760. Short-range transceiver may include for example a Bluetooth wireless interface or headset plugged into a headset jack, and may be used when a mobile device is used in hands-free mode. Hands-free mode as used herein in this specification can include any mode in which a user is enabled to operate with the user interface by non-primary means.

User interface 740 as used discussed in this specification can include any combination of hardware, software, and firmware configured to enable a user to interact with endpoint 12, whether or not in real-time. In the example embodiment, user interface 740 includes a speaker 742, a microphone 744, and a touch-sensitive display 746, which acts as a combined input/output device, and a camera 748 such as a webcam. User interface 740 may include software services such as a graphical user interface, including real-time dialog boxes that solicit input or confirmation from a user. User interface 740 may also include configuration files or configuration screens that permit a user to control certain behavior of VCC 732 with forethought.

Storage 750 is disclosed as an example embodiment of a non-volatile memory element, which may be a species of memory 720. In some embodiments, memory 720 and storage 750 may be provided by a single physical device, which may be partitioned into different regions. In other embodiments, memory 720 and storage 750 may be separate devices, with memory 720 being a relatively low-latency volatile memory device, and storage 750 being a relatively high-latency non-volatile memory device. Many other configurations are also possible, and are intended to be encompassed within the broad scope of this specification.

Application programming interface 730 can include any intermediate layer in hardware, software, firmware, or a combination thereof that enables VCC 732 to send or receive data, signals, messages, or triggers to or from endpoint 12. VCC 732 can include any hardware, software, firmware, or any combination within an endpoint 12 that enables a user to participate in or interact with a virtual conference. In certain embodiments, VCC 732 may include a WebEx module 70, conference resource module 82, and meeting place module 72 as described in connection with FIG. 2. In the example embodiment, VCC 732 communicates with processor 710 and other elements of endpoint 12 via API 730.

Certain embodiments of the present specification may collide with corporate security configurations, including firewalls. In an example, XMPP may be used for communication between devices, and XMPP may attempt to connect over a port that is blocked by a corporate security policy or firewall. Such devices may be serviced by a traditional file transfer from VCS 44. However, if a large number of devices are so restricted, certain benefits of the present specification may be attenuated. Thus it may be desirable to select a security configuration that will work well with corporate security measures.

In one example, if a connection cannot successfully be made over a first preferred port or protocol, a device may instead attempt to connect on a different port, such as port 80, commonly used for hypertext transfer protocol (HTTP), port 443 (the port for secure HTTP (HTTPS)) or port 5280 (commonly used for XMPP traffic). In other embodiments, a port in the "registered" range (above 1024) may be selected, or alternatively an "ephemeral" port in the range of 4915-65535 may be selected. In enterprises where an embodiment of the present specification is to be deployed, it may be beneficial to configure the embodiment to use a predictable port or range of ports and to configure the firewall to specifically permit use of those ports. For additional security, an example embodiment of the present specification may be tightly coupled with an antivirus or anti-malware scanner to prevent or detect transfer of malicious or damaged files.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the servers, endpoints, bridges, recording elements, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A method for delivering a file to N receiver devices over a virtual conference architecture, the method comprising:
    initiating a connection to a virtual conference via a virtual conference server;
    acting as a sender:
        receiving from the virtual conference server peer-to-peer capability data about the N receiver devices;
        dividing the file into at least N segments;
        building a table comprising data correlating the segments to the receiver devices;
        sending the table to the virtual conference server;
        sending a first segment to each receiver in a first iteration; and
        sending a part of another segment to a requesting receiver on a second iteration;
    acting as one of the receivers:
        on a first iteration, receiving a first segment $k_0$ of the file from the sender;
        storing the first segment on a memory;
        querying the virtual conference server for the table;
        on a second iteration, determining from the table a plurality of m devices having stored in their respective memories a second segment $k_1$; and
        dividing $k_1$ into a plurality of m parts, and requesting a part of segment $k_1$ from each of the m devices having stored in their respective memories a segment of $k_1$.

2. The method of claim 1, further comprising:
    continuing to identify additional devices having additional desired segments of the file, and requesting the additional desired segments of the file from the additional devices, until a complete file has been received.

3. The method of claim 1, further comprising:
    identifying a plurality of devices having stored on their respective memories the next desired segment of the file; and
    requesting from each of the plurality of devices a part of the next desired segment of the file.

4. The method of claim 1, further comprising:
    continuing to identify additional devices having additional desired segments of the file, and requesting parts of the additional desired segments of the file from the additional devices, until a complete file has been received.

5. The method of claim 1, wherein the file is divided into substantially equal segments, and wherein a peer-to-peer (P2P) connection is established to each of the N receiver devices for receiving a respective one of a plurality of segments associated with the file.

6. One or more tangible non-transitory computer-readable media storing logic for execution, the logic when executed causing transfer of a file from a sender device to N receiver devices, the logic including instructions to:
    (1) initiate a connection to a virtual conference via a virtual conference server;
    (2) act as the sender comprising instructions to:
        (a) receive from the virtual conference server peer-to-peer capability data about the N receiver devices;
        (b) divide the file into at least N segments;
        (c) build a table comprising data correlating the segments to the devices;
        (d) send the table to the virtual conference server;
        (e) send a first segment to each receiver in a first iteration; and
        (f) send a part of another segment to a requesting receiver on a second iteration; and
    (3) act as one of the receivers comprising instructions to:
        (a) on a first iteration, receive a first segment $k_0$ of the file from the sender;
        (b) store the first segment on a memory;
        (c) query the virtual conference server for the table;
        (d) on a second iteration, determine from the table a plurality of m devices having stored in their respective memories a second segment $k_1$; and
        (e) divide $k_1$ into a plurality of m parts, and request a part of segment $k_1$ from each of the m devices having stored in their respective memories a segment of $k_1$.

7. The media of claim 6, wherein the instructions to act as one of the receivers further comprise instructions to:
    continue identifying additional devices having additional desired segments of the file, and request the additional desired segments of the file from the additional devices, until a complete file has been received.

8. The media of claim 6, wherein the instructions to act as one of the receivers further comprise instructions to:
    identify a plurality of devices having stored on their respective memories the next desired segment of the file; and
    request from each of the plurality of devices a part of the next desired segment of the file.

9. The media of claim 6, wherein the instructions to act as one of the receivers further comprise instructions to:
    continue identifying additional devices having additional desired segments of the file, and request parts of the additional desired segments of the file from the additional devices, until the complete file has been received.

10. An endpoint device, comprising:
    a processor;
    a network interface configured to communicatively couple the processor to a network; and
    a memory having stored thereon logic for execution that when executed causes the processor to:

initiate a connection to a virtual conference on the network interface via a virtual conference server;

act as the sender comprising instructions to:
a) receive from the virtual conference server peer-to-peer capability data about the N receiver devices;
b) divide the file into at least N segments;
c) build a table comprising data correlating the segments to the devices;
d) send the table to the virtual conference server;
e) send a first segment to each receiver in a first iteration; and
f) send a part of another segment to a requesting receiver on a second iteration;

act as one of the receivers comprising instructions to:
a) on a first iteration, receive a first segment $k_0$ of the file from the sender;
b) store the first segment on a memory;
c) query the virtual conference server for the table;
d) on a second iteration determine from the table a plurality of m devices having stored in their respective memories a second segment $k_1$ second device having stored on its memory a next desired segment of the file; and
e) divide $k_1$ into a plurality of m parts, and request a part of segment $k_1$ from each of the m devices having stored in their respective memories a segment of $k_1$.

11. The endpoint device of claim 10, wherein the instructions to act as one of the receivers further comprise instructions to:

continue identifying additional devices having additional desired segments of the file, and request the additional desired segments of the file from the additional devices, until a complete file has been received.

12. The endpoint device of claim 10, wherein the instructions to act as one of the receivers further comprise instructions to:

identify a plurality of devices having stored on their respective memories the next desired segment of the file; and request from each of the plurality of devices a part of the next desired segment of the file.

13. The endpoint device of claim 10, wherein the instructions to act as one of the receivers further comprise instructions to:

continue identifying additional devices having additional desired segments of the file, and request parts of the additional desired segments of the file from the additional devices, until a complete file has been received.

14. The endpoint device of claim 10, wherein the instructions to act as one of the receivers further comprises instructions to:

continue identifying additional devices having additional desired segments of the file, and request parts the additional desired segments of the file from the additional devices, until a complete file has been received.

\* \* \* \* \*